US007669470B2

(12) United States Patent
Sanford

(10) Patent No.: US 7,669,470 B2
(45) Date of Patent: Mar. 2, 2010

(54) MAIL PIECE STIFFNESS DETECTOR

(75) Inventor: David M. Sanford, Richardson, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 243 days.

(21) Appl. No.: 11/825,689

(22) Filed: Jul. 9, 2007

(65) Prior Publication Data

US 2009/0013756 A1 Jan. 15, 2009

(51) Int. Cl.
*G01L 5/00* (2006.01)
*B07C 5/34* (2006.01)

(52) U.S. Cl. ........................................ 73/159; 209/599

(58) Field of Classification Search .................. 73/587, 73/159, 658, 579; 209/584–586, 552–553, 209/599, 900, 592
See application file for complete search history.

(56) References Cited

U.S. PATENT DOCUMENTS 4,463,607 A * 8/1984 Hilton ........................ 73/587
4,991,423 A 2/1991 Houghton et al. ............. 73/159
5,637,811 A 6/1997 Simard et al. .............. 73/865.8
6,032,517 A 3/2000 Reisig et al. .................... 73/78
6,574,569 B1 6/2003 Omata et al. .................. 702/33
7,096,743 B2 8/2006 Vogel et al. .................... 73/849
7,315,007 B2 * 1/2008 Redford et al. ............. 209/584
2004/0245158 A1 12/2004 Redford et al. ............. 209/584
2008/0251429 A1 * 10/2008 Norris et al. ................ 209/584

* cited by examiner

*Primary Examiner*—Helen C. Kwok

(57) ABSTRACT

An apparatus for determining the stiffness of mail pieces includes a bar or similar deflector for contacting a mail piece conveyed past the bar by a conveyor system, and vibrates when in contact with a passing mail piece, either due to the impact of the mail piece or by the action of a device which causes the deflector to vibrate before the mail piece hits it. A sensor measures a parameter indicative of change in the vibrations of the deflector and generates a signal indicative of the measured parameter. A processor, e.g. programmable controller or circuit, receives the signal from the sensor and determines a stiffness value for the mail piece based on decay in vibrations of the deflector caused by contact with the mail piece.

15 Claims, 9 Drawing Sheets

MAIL PIECE STIFFNESS DETECTOR

TECHNICAL FIELD

The invention relates to mail processing and in particular to a method and apparatus for determining the properties of mail pieces in an automated mail processing environment.

BACKGROUND OF THE INVENTION

Postal services utilize specialized equipment to transport, scan, sort and process tens of millions of envelopes and other flat pieces of mail on a daily basis. These automated systems and machines necessarily utilize specialized equipment designed to transport, scan, process and sort envelopes and other flat pieces of mail. To insure reliable operation of these machines, mail pieces having physical properties incompatible with automated processing equipment must be separated from the mail stream at the earliest opportunity. In particular, mail pieces that are too stiff or rigid to be transported must be diverted from automated processing lines to avoid jamming the machines and/or being destroyed during processing.

U.S. Pat. No. 7,096,743 issued Aug. 29, 2006 to Vogel, discloses an device for measuring the flexural rigidity in the longitudinal direction of flat items of mail a conveying path. The apparatus includes a sensor for detecting the edges of the items of mail and signaling a control device when a mail item reaches a selected bearing point. A deflection apparatus moves into the conveying path under the control of the control device to bend the mail item. The magnitude of the deflection of the mail item and the magnitude of the deflection force are measured to determine the flexural rigidity of the mail item.

Reisig, et al., U.S. Pat. No. 6,032,517, issued Mar. 7, 2000, discloses an arrangement for measuring the rigidity of flat items by means of elastic conveying belts that extend through a curved section of a conveying path. A rigidity sensor is provided for measuring the deflection of the conveying belts caused by the item passing through the curved section, and a thickness sensor is used to determine the thickness of the item. An evaluation device is provided for determining the rigidity of an item passing through from the values obtained by the thickness and rigidity sensors.

Redford U.S. Patent Application 20040245158, Dec. 9, 2004, describes a method and apparatus for stiffness and thickness detection in mail sorting systems by conveying a singulated stream of flat mail pieces one at a time though a test curve upstream from the sharpest curve of the mail processing machine, the test curve including an angled section at which each mail piece tends to bend, determining the thickness of each mail piece, determining the stiffness of each mail piece by measuring deflection of one of the belts of the test curve as an end portion of the mail piece is passing through the angled section, which deflection is in excess of deflection caused by the thickness of the mail piece as it passes between the belts, and diverting a mail piece out of the mail processing machine before it reaches the sharpest curve of the mail processing machine if predetermined stiffness and thickness criteria are exceeded by the thickness and stiffness of the mail piece. The angled section defines an angle less severe than the sharpest curve, whereby a mail piece that would likely jam the mail processing machine at the sharpest curve can pass through the test curve without jamming.

The foregoing devices require bending the mail pieces by transporting the mail pieces through a curved path. This in turn requires moving parts such as conveyors and rollers as well as space in which to install the devices. Elimination of these parts would simplify and reduce the size or length of the processing line. Ideally, a stiffness detector for use in an high speed automated mail processing line will process the mail without damaging individual mail pieces, have a small footprint, a minimum number of moving parts and will be capable of meeting the throughput requires of the line.

SUMMARY OF THE INVENTION

The invention provides an apparatus for determining the stiffness of mail pieces including a bar or similar deflector for contacting a mail piece conveyed past the bar by a conveyor system, and vibrates when in contact with a passing mail piece, either due to the impact of the mail piece or by the action of a device which causes the deflector to vibrate before the mail piece hits it. A sensor measures a parameter indicative of change in the vibrations of the deflector and generates a signal indicative of the measured parameter. A processor, e.g. programmable controller or circuit, receives the signal from the sensor and determines a stiffness value for the mail piece based on decay in vibrations of the deflector caused by contact with the mail piece.

In one embodiment, the deflector comprises a beam having a distal end projecting into a path defined by an automated mail processing line such that mail pieces conveyed along the path contact the beam. In another embodiment, the deflector comprises a driven or non-driven roller extending across the mail path. A forcing function device such as an electromagnet, piezotransducer, or striker may be employed to induce vibrations in the deflector.

The invention further provides a method for removing excessively stiff mail pieces being transported on a conveyor system from a mail processing machine such as a mail sorter. The method includes feeding mail pieces to be processed one at a time into a conveyor of the mail processing machine, conveying the mail pieces one at a time past an apparatus for determining the stiffness of passing mail pieces as described above, determining the stiffness of each mail piece using the stiffness determining apparatus, and diverting out of the mail processing machine mail pieces having excessive stiffness. Where the mail processing machine is a mail sorting machine wherein a sorted mail piece is diverted to one of a plurality of bins based on scanned address information, the diverting step is preferably carried out before a mail piece having excessive stiffness reaches a stacker section of the machine housing the bins. These and other aspects of the invention are discussed further in the detailed description that follows.

BRIEF DESCRIPTION OF THE DRAWINGS

In the accompanying drawing, wherein like numerals denote like elements.

DETAILED DESCRIPTION

The present invention provides a stiffness detection system that uses a deflector such as a rod, plate or bar that is placed in the path of a mail processing machine such as sorter (MLOCR or DBCS machine) or automated facer-canceler system (AFCS). The detection system is placed in an appropriate position along a gap in one side of a pinch belt conveyor system, such as upstream of the first sorting gate as described for the system of Redford et al. U.S. Patent Application 20040245158, Dec. 9, 2004, the contents of which are incorporated by reference herein. Preferably, apparatus 10 is positioned at or near the beginning of the mail processing line. Positioning apparatus 10 at or near the beginning of the line enables detection of mail pieces incompatible with down steam equipment so that such mail pieces may be diverted before jamming any processing equipment. For example, the apparatus may be positioned immediately after the pick off feeder that singulates batches of incoming mail for processing.

Figure 1:
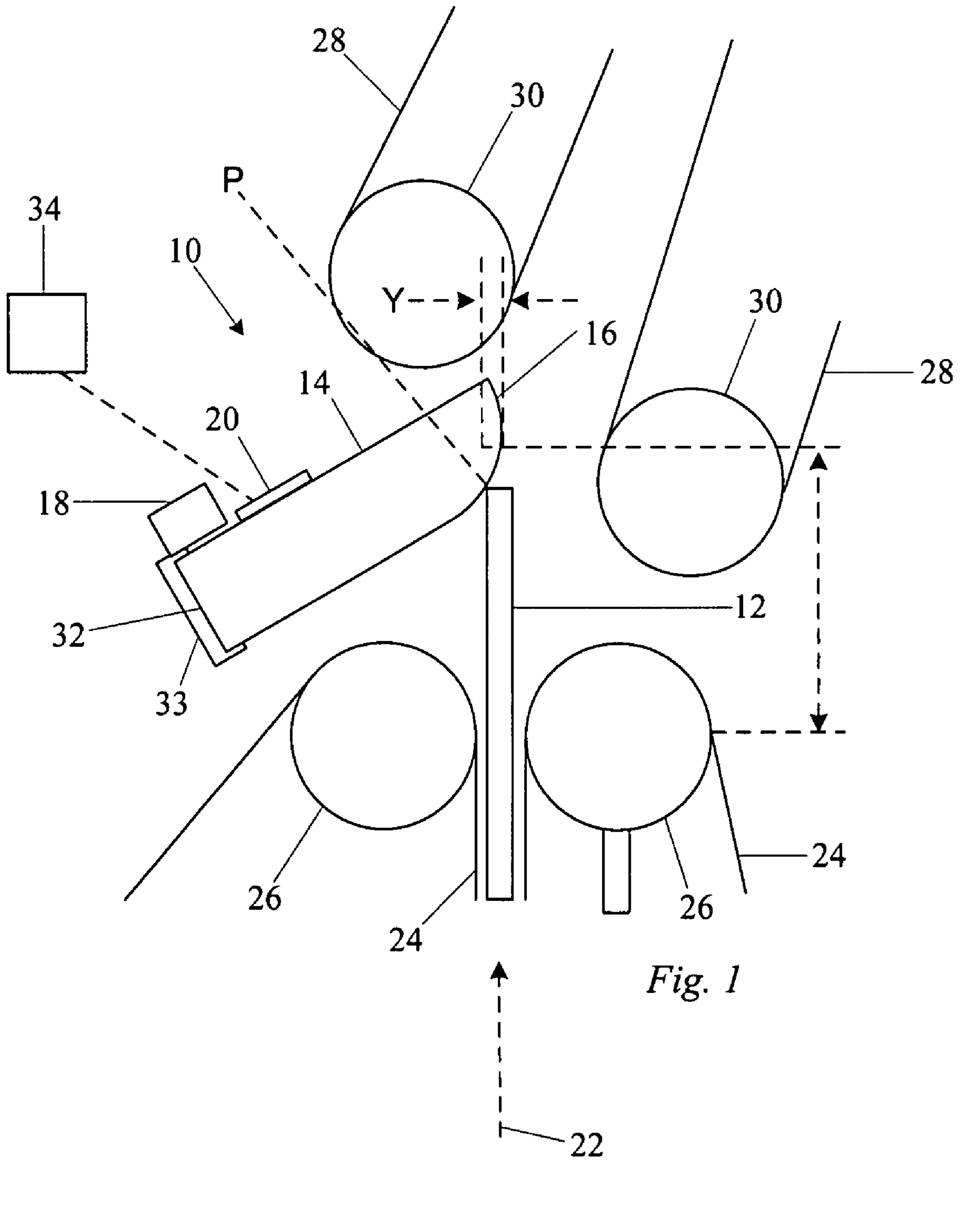
FIG. 1 is a schematic side view of an apparatus according to the invention.

Referring to FIG. 1, an apparatus 10 according to the invention for detecting the stiffness of a mail piece 12 includes a deflector such as a bar or beam 14 with a curved or beveled distal end 16 for contacting a mail piece 12. A proximate end 32 of beam 14 is rigidly secured to a fixture (base or bracket) 33. Beam 14 is made of a material such as steel capable of vibrating at frequencies and amplitudes measurable using the techniques described hereafter, and the dimensions of beam 14 likewise must permit such vibration.

For a beam held at one end that is subject to a force applied at its free end, Young's modulus determines the amount of deflection produced by a given force. The normal force created by bending a mail piece 12 that is passing by the free end of the beam 14 along the conveyor changes the way in which the beam 14 vibrates in a manner that varies according to the stiffness of the mail piece. The waveform for a graph of vibration versus time after contact between the beam and a dampening object is sinusoidal and decays exponentially.

A mail piece 12 is deflected by a small distance "y" in the Young's modulus equation. The resulting normal "p" force is that necessary to deflect the mail piece distance y. That force will be small for mail pieces that are not very stiff, larger for mail pieces that are stiff. If that force is then applied to a vibrating body, then the damping that occurs will be proportional to the force that was applied to the vibrating body. As shown in the examples which follow, the dampening effect on the decay waveform is approximately proportional to the stiffness of the dampening object. As such, a decision as to whether an object is excessively stiff could be made based on predetermined threshold levels determined mathematically, empirically with reference to reference curves for mail pieces of known stiffness, or a combination of these approaches.

Beam 14 in this embodiment is an elongated, generally rectangular steel beam; however, deflectors having other geometries such as a plate or round rod may be employed. While the distal end 16 of beam 14 is preferably rounded to avoid damaging mail pieces contacting the bar, other end geometries may be used. A forcing function device 18 is mounted on contact beam 14 for inducing vibrations in the beam. Forcing function device 18 may be an electromagnet similar to a audio speaker coil or a similar device capable of inducing relatively high frequency vibrations in contact beam 14. In an alternative embodiment, forcing function device 18 is a striker that impacts beam 14 just prior to, or as mail piece 12 comes in contact with the beam. Known position and velocity sensors may be utilized to determine when a mail piece will contact beam 14 and control the timing of impacts on the beam 14 with the striker. According to a third alternative, no device for inducing vibrations prior to contact with a mail piece is provided, and the impact of the mail piece on the bar is used to create vibrations which are then dampened as the mail piece passes by in accordance with the stiffness of the mail piece.

A sensor 20 is mounted on beam 14 for measuring the amplitude and frequency of vibrations in the contact beam. As illustrated, forcing function device 18 and sensor 20 are mounted directly on contact beam 14. However, the forcing function device 18 and sensor 20 could be mounted in close proximity to beam 14 without contacting it as long as the device and sensor perform the functions of inducing and measuring vibrations in contact beam 14.

Mail pieces 12 are conveyed along a path 22 between first opposed belt conveyors 24 that are guided over rollers 26 which may be conventionally driven with motors, either directly or with a belt, chain or other drive system. Mail pieces 12 discharged from first opposed belt conveyors 24 are received and conveyed by a second set of opposed belt conveyors 28 that are guided over rollers 30. Apparatus 10 is positioned adjacent a gap between belt conveyors 24 and 28 such that path 22 intersects the distal end 16 of contact beam 14.

The proximate end 32 of contact beam 14 is secured in a frame or bracket such that the leading end of a mail piece 12 traveling along path 22 through the gap between belt conveyors 24 and 28 will contact end 16 of beam 14 while a portion of the mail piece is still pinched between belts 24. Contact beam 14 extends sufficiently into path 22 to displace mail piece 12 a small distance, for example several millimeters. Forcing function device 18 induces vibrations in the beam 14 that change in response to mail piece 12 contacting beam 14 as the mail piece travels along path 22. The natural frequency of beam 14 is not critical so long as the frequency is high enough to be distinguishable from environmental vibrations such as vibrations generated by normal machine operation. Preferably the natural frequency is high enough to enable a relatively large number of readings to be taken during the time mail piece 12 is in contact with beam 14 and in pinch between opposed belt conveyors 24. Natural frequency is important because the frequency of the beam 14 will change as force is applied to it. This is another way to determine the amount of force on the beam.

Conveyor 28 is at an obtuse angle less than 180 degrees relative to conveyor 26 and path 22 in order to smoothly receive mail piece 12 after it deflects off of end surface 16. The belts 28 downstream from the vibrating beam or plate 16 are the next step in transporting a letter through the machine to a final sorting pocket. Belts 28 should not touch mail piece 12 while it is being measured, but serve to guide it back into pinch after the measurement. Since the thickness and size of the mail piece 12 and the amount of deflection of the mail piece 12 are unknown, the downstream belts 28 are set at different angles to converge and thereby handle a range of incoming mail pieces and reposition each mail piece back into the transport system.

As an alternative, device 10 may be positioned in front of a leveler. A leveler does not hold the letter in pinch. Instead, it has a belt below the mail piece that moves at the same speed as the two side belts. At the end of the leveler, the mail piece is guided back into pinch.

In order to determine a stiffness value for mail piece 12 conveyed along path 22, forcing function device 18 is activated to induce high frequency vibrations in contact beam 14. Forcing function device 18 may be operated continuously or activated only when a mail piece is approaching the gap between belt conveyors 24 and 28. When mail piece 12 contacts beam 14, the normal force applied to the beam as a result of displacing the mail piece from path 22 will change the vibration of the beam according to the stiffness or flexibility of the mail piece. A stiffer mail piece in contact with beam 14 will dampen vibrations in the beam at a different rate than a more flexible mail piece.

Sensor 20 senses the change in the magnitude and frequency of vibrations in beam 14 as mail piece 12 contacts the beam and transmits the results to a processor 34 that correlates the results to determine a stiffness value for the mail piece. Processor 34 preferably operates by first deriving a parameter from the measured vibration decay curve, which parameter is indicative of the stiffness of the mail piece. In the illustrated embodiment, a simple form of stiffness index was derived using a circuit that begins counting the number of readings taken between an upper set point and lower set point. The counter stops when the value of the readings below the lower limit. The resulting decay rate, expressed as a hexadecimal number, is recorded as a stiffness index. A greater number of readings indicates slower decay of the curve and thus a more flexible mail piece, whereas a smaller number of readings between the same two set points indicates a stiffer mail piece. This is but one possible means of evaluating relative stiffness of passing objects, and if a processor is available that can perform computations on the curve data, then an actual rate of decay can be derived.

Using the calculated stiffness index, processor 34 may use either an algorithm or an empirically derived lookup table to determine whether the stiffness level is acceptable or unacceptable. Such a lookup table may be generated by passing sample mail pieces of known stiffness thorough apparatus 10 to determine threshold values and ranges for acceptable and unacceptable levels of stiffness. In order to accurately determine the dampening effect of the mail piece on vibrations in beam 14, only readings taken while mail piece 12 is in pinch between belts 24 and rollers 26 are used to determine the stiffness value.

The stiffness value generated by the processor may be used in conjunction with a predetermined maximum threshold to identify mail pieces to be diverted from the mail stream as too stiff to process. Alternatively, as disclosed in U.S. Patent Publication No. 20040245158 cited above, the stiffness value may be used in connection with other characteristics of the mail piece such as thickness and length to determine whether the mail piece is compatible with downstream process equipment. Known sensors such as photocells, laser measuring devices, proximity devices, motion detectors and similar devices may be used to determine the position, height, length and thickness of mail piece 12 as it travels along path 22.

Figure 2:
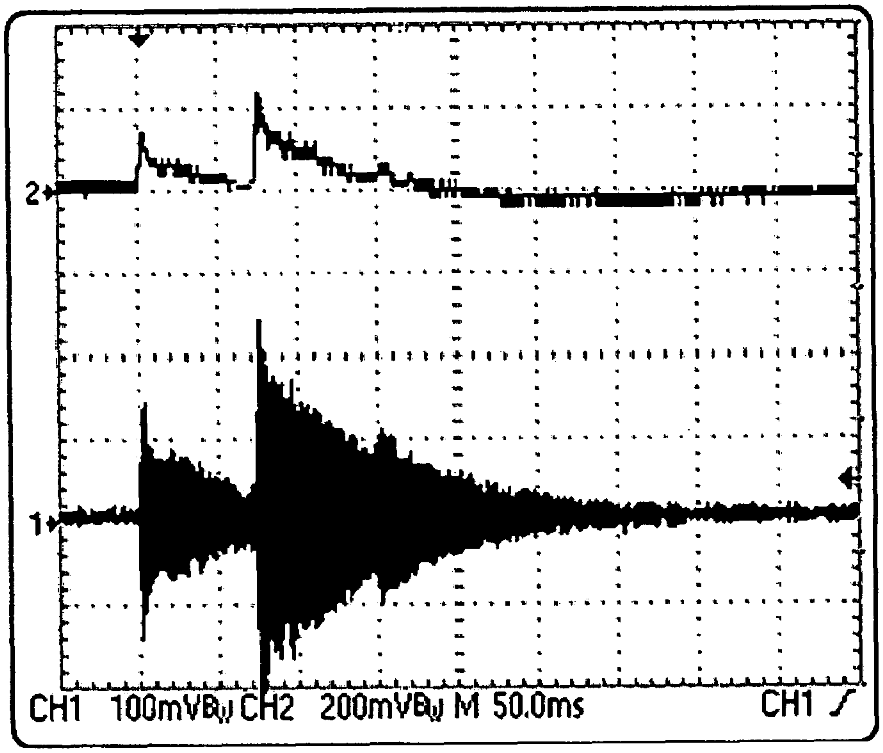
FIGS. 2 to 5 each show a pair of traces of vibration amplitude versus time for a vibrating bell plate contacted by one or more mail pieces.

To illustrate the dampening effect, FIG. 2 graphically shows vibrations induced in a stationary bell plate placed in a mail processing path when the plate is impacted with three different letters in succession. Two of the letters were approximately 5 mm thick and filled with card stock of thickness 178, 205 mm respectively while the third was approximately 5 mm thick and filled with 178 mm thick foam. The first impact is the envelope filled with a 178 mm card stock that is not in pinch (held between belts or rollers) when it contacts the plate. The second impact is the letter filled with 305 card stock that is in pinch when it contacts the plate. The third impact is the envelope filled with 178 mm foam that impacts the plate while not in pinch. The top trace in each of the figures is generated with a peak detect circuit to illustrate the decay rate of vibrations caused by the impact of the letters on the bell plate. A distinct peak corresponding to the impact of each letter can be seen, with the thicker stiffer letter (the second) producing the strongest impact. The results illustrate that the method of the invention can be used on a series of mail pieces passing by in succession, even when the gap between mail pieces is not controlled and/or the trailing end is not in pinch.

Figure 3:
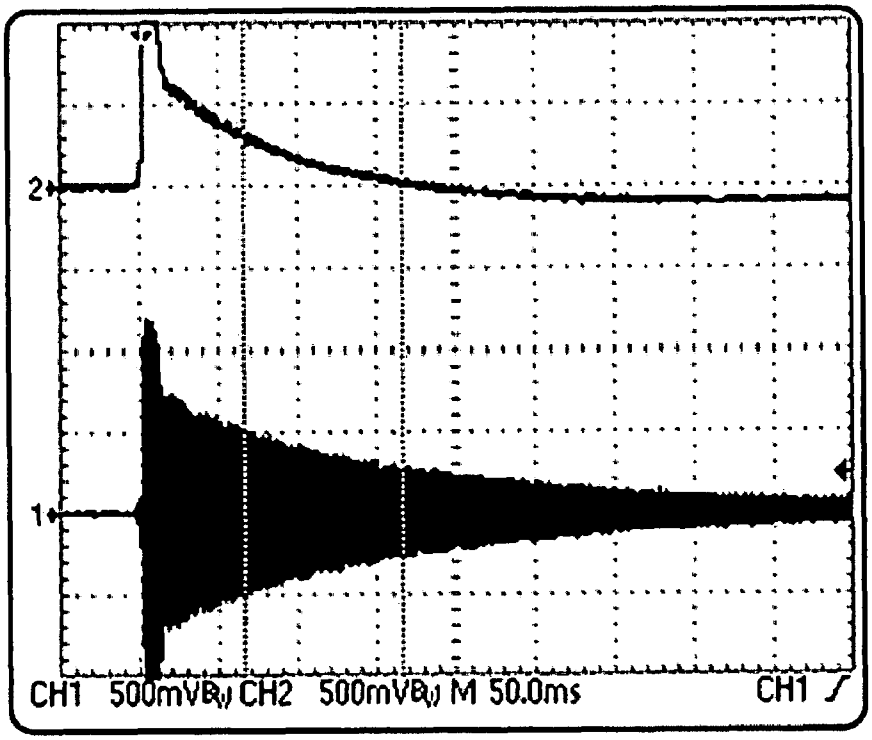

FIG. 3-6 show the results of contacting a bell plate with envelopes and striking the plate with a spoon to induce vibrations. The upper trace in each figure represents the rate of decay of the induced vibrations. The stiffness index as measured for the segment between the vertical dotted lines was 1180 hex (4480 decimal). FIG. 3 shows the rate of decay when the plate is contacted with an empty number 10 envelope.

Figure 4:
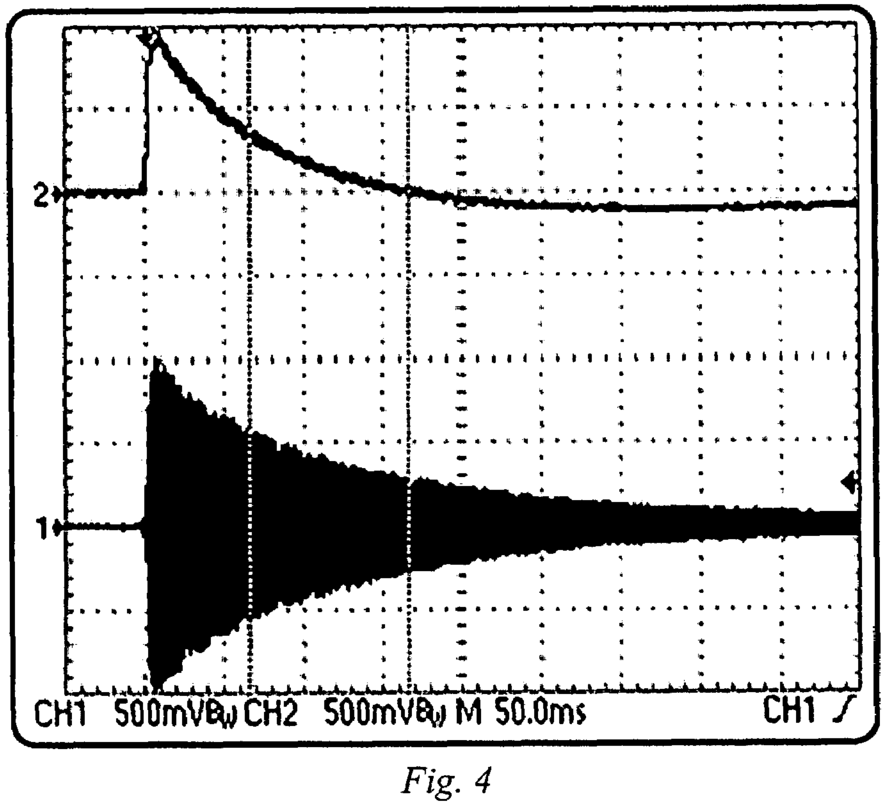
Figure 5:
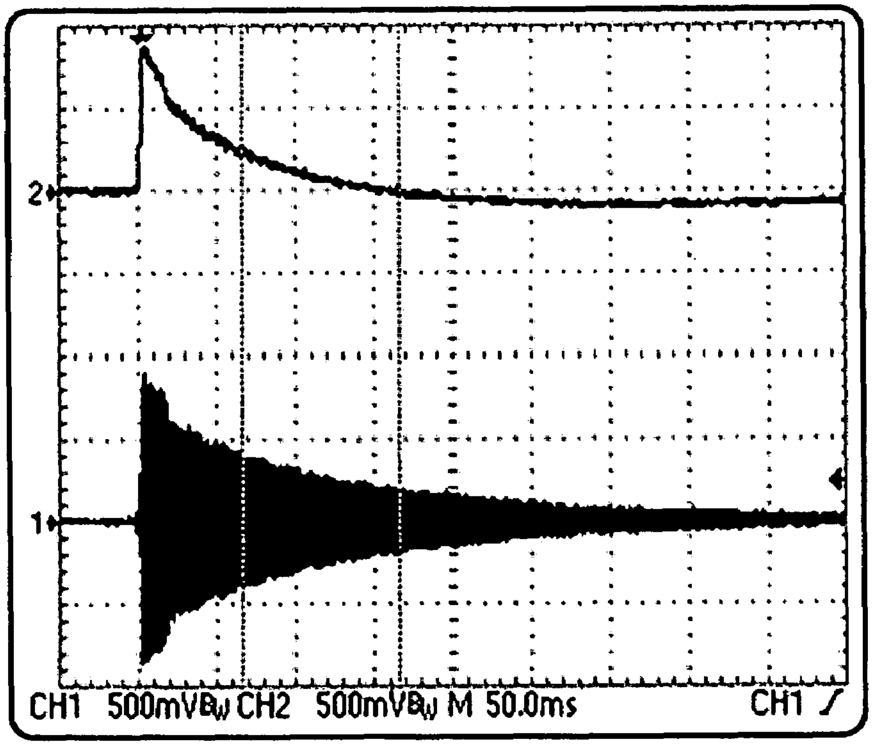

FIG. 4 illustrates the rate of decay when the plate is contacted with a number 10 envelope with a piece of card stock in the envelope. The stiffness index was 3872 decimal. FIG. 5 illustrates the decay rate when the plate is contacted with a number 10 envelope containing two pieces of card stock in the envelope. The stiffness index was 3487 decimal.

Figure 6:
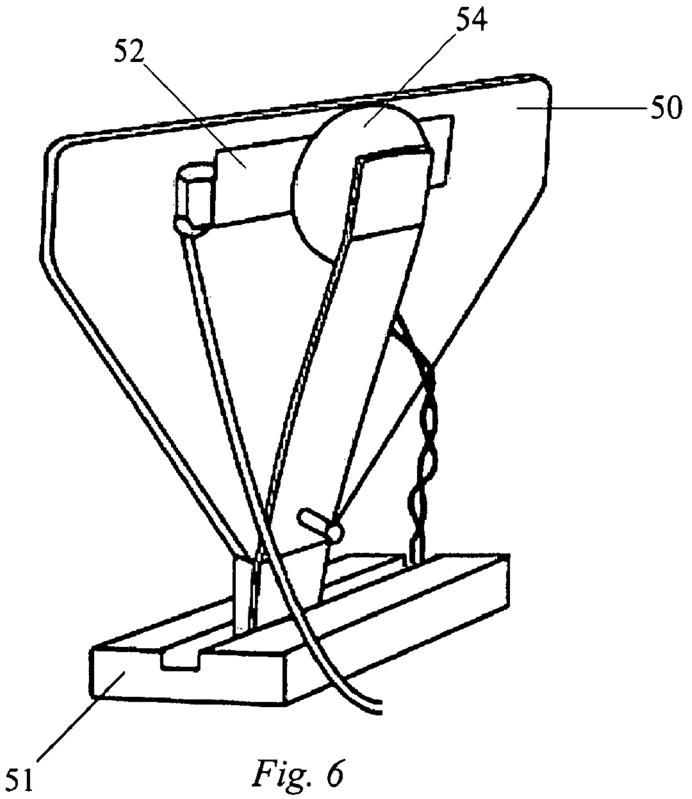
FIGS. 6 and 7 are front and rear perspective views of a bell plate used in examples according to the invention.
Figure 7:
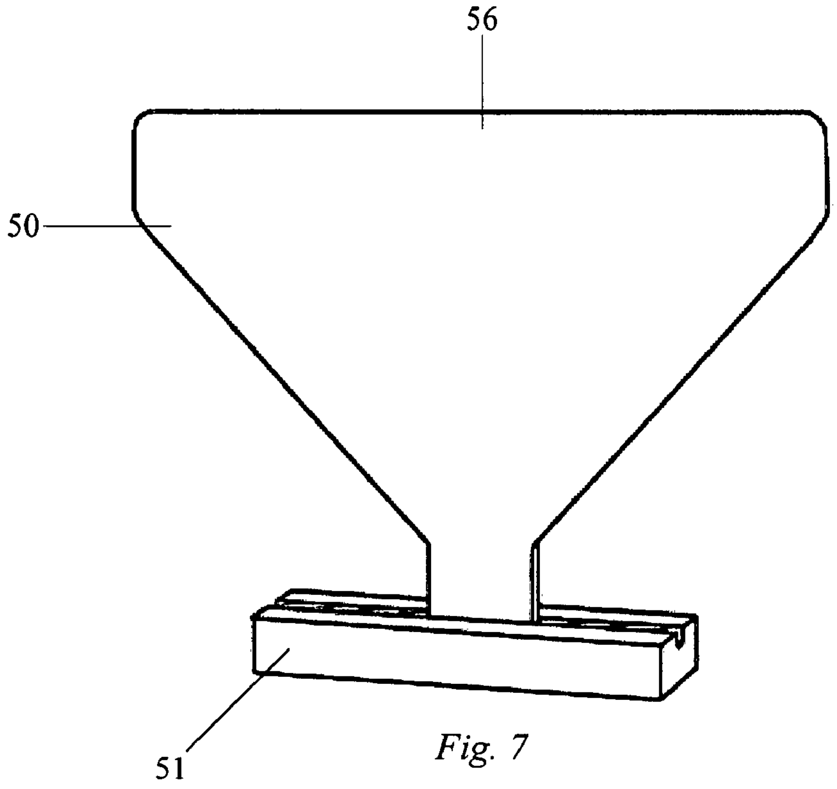
Figure 8:
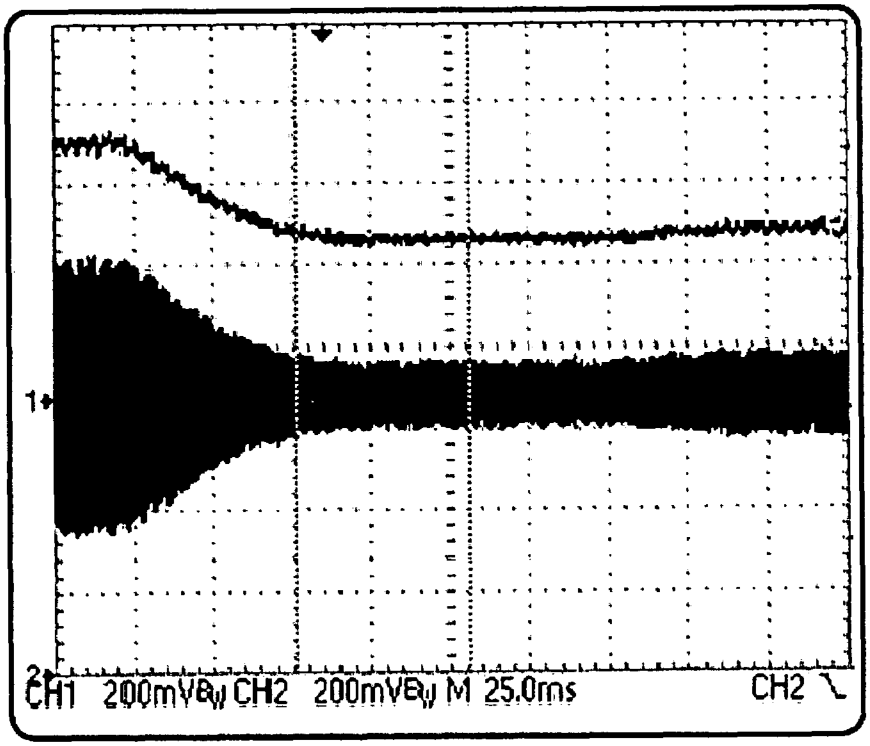
FIGS. 8 to 10 each show a pair of traces of vibration amplitude versus time for a vibrating bell plate contacted by an object that is held against the plate.
Figure 9:
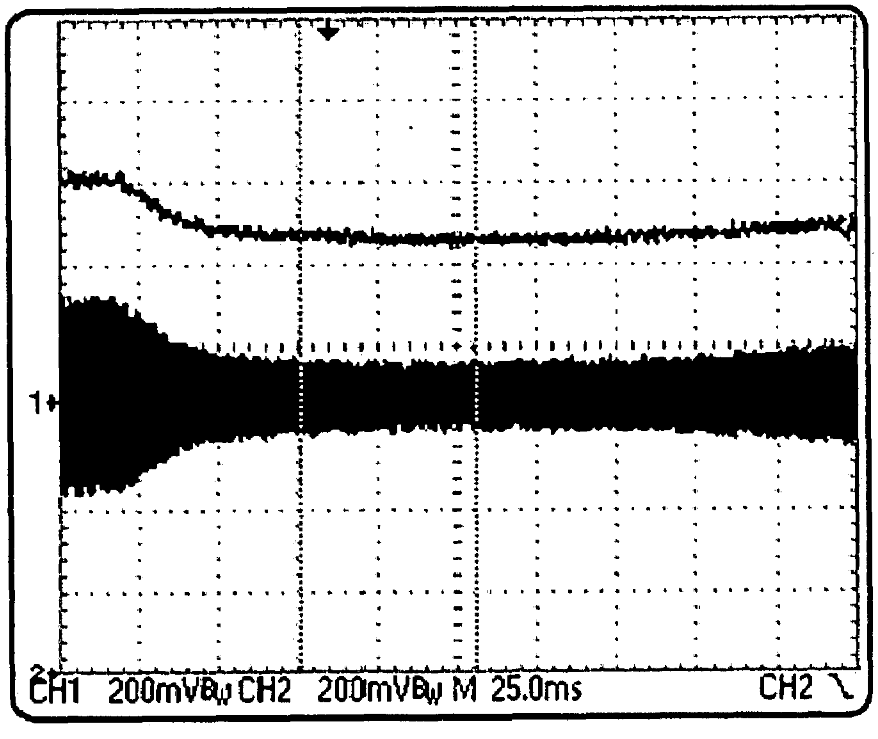
Figure 10:
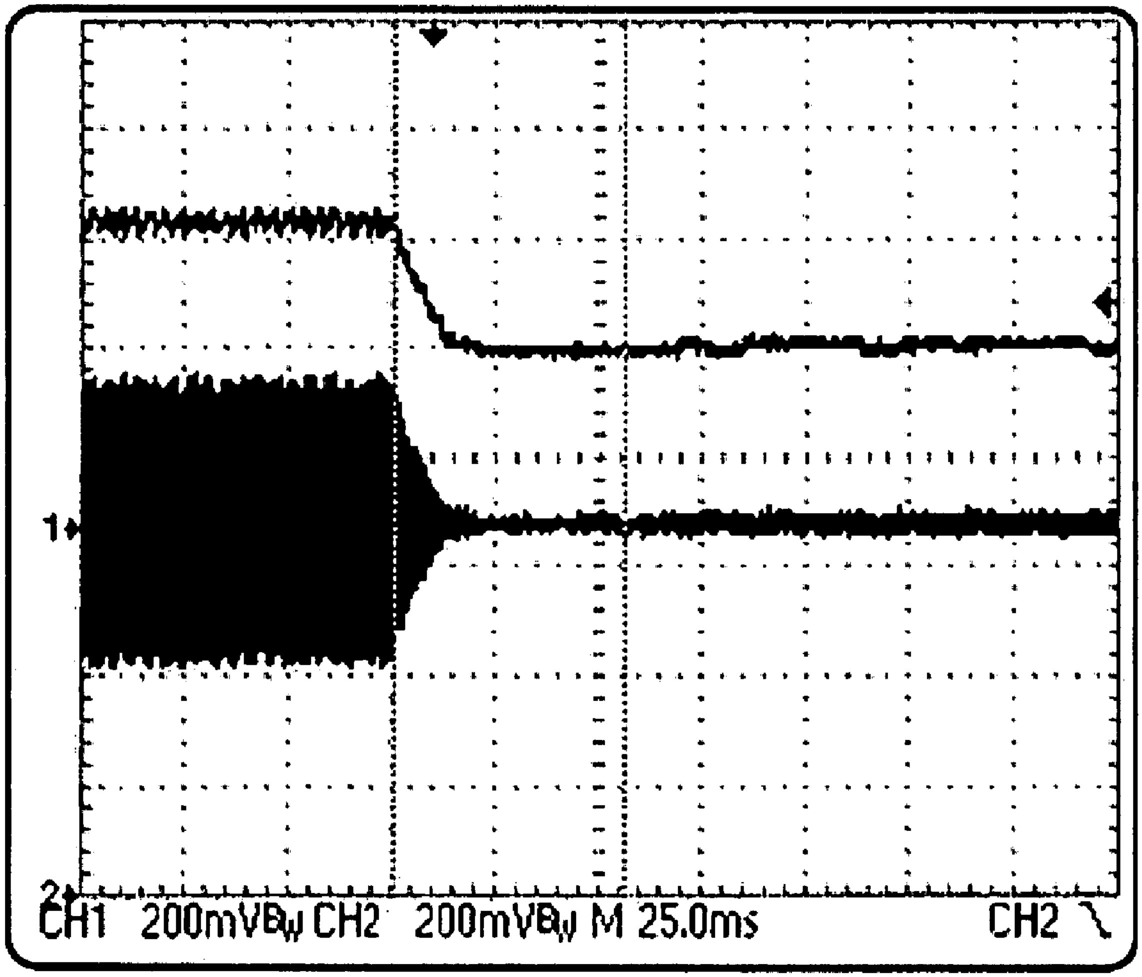

FIGS. 6 and 7 illustrate a bell plate 50 mounted in a base 51. Bell plate 50 has an attached piezoelectric sensor 52. An audio speaker 54 (forcing function device) is positioned adjacent to bell plate 50. A small plastic dowel mounted at the center of the speaker cone touches the bell plate 50. Speaker 54 is driven at a resonant frequency of 1.4 KHz to induce vibrations in the plate. FIG. 8 shows the dampening effect as measured with piezoelectric sensor 52 when a thin piece of cardboard is pressed against surface 56 of plate 50. FIGS. 9 and 10 illustrate the dampening effect when a thin piece of cardboard and a spoon, respectively, are pressed against the plate.

Figure 12:
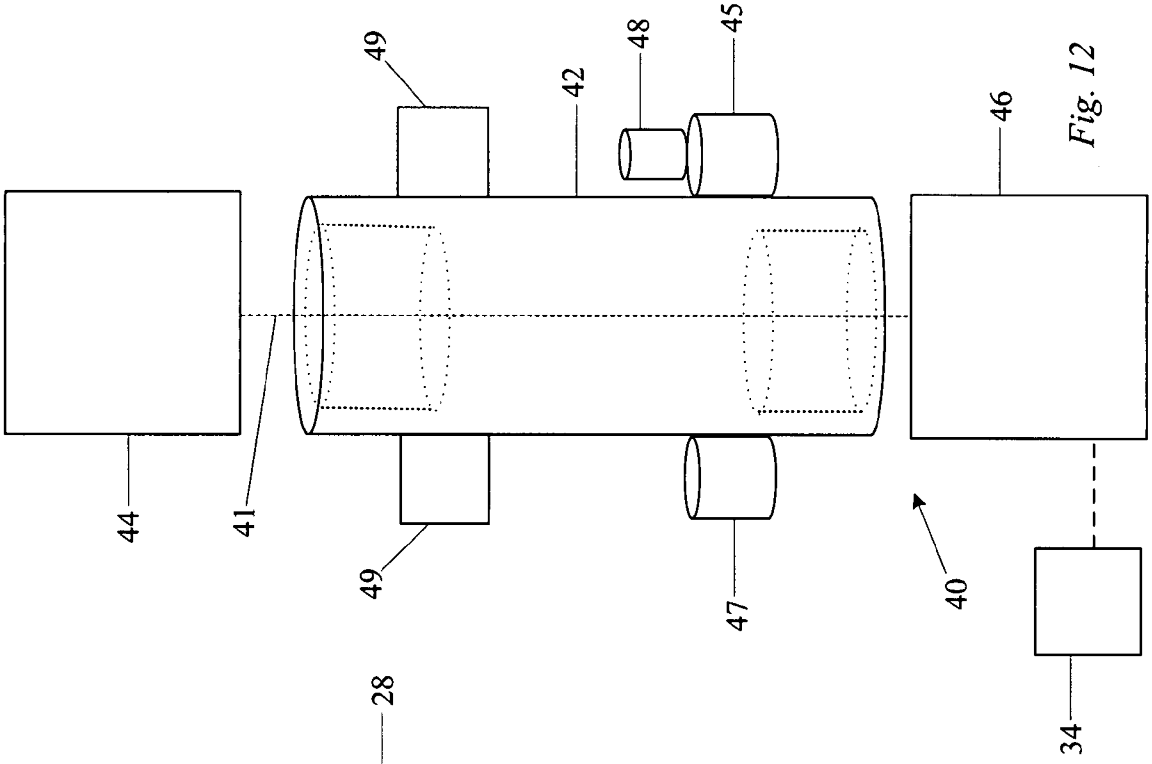
FIG. 12 is a schematic side view of the roller mechanism of FIG. 11.
Figure 11:
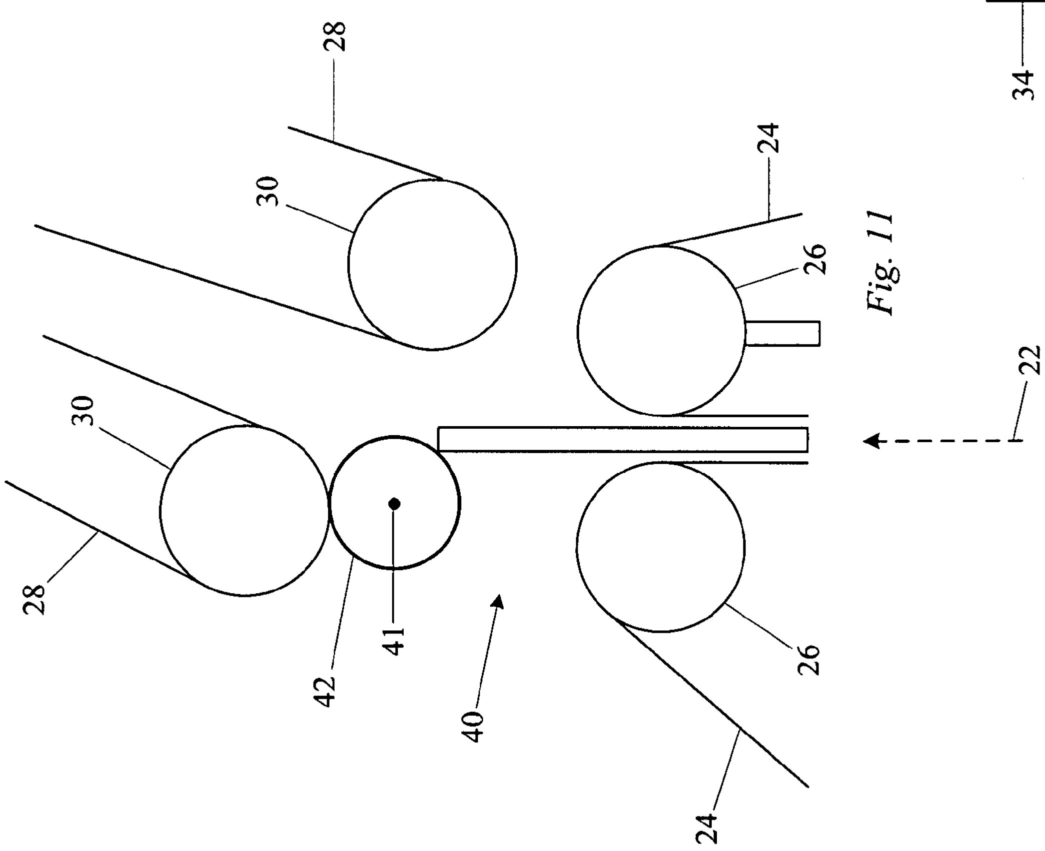
FIG. 11 is a schematic end view of a further apparatus according to the invention.

Referring to FIGS. 11 and 12, in a second embodiment of the invention, an apparatus 40 includes a vibrating, tubular roller 42 having a lengthwise axis 41 in place of contact beam 14. Roller 42 extends perpendicular to and across path 22 such that a mail piece conveyed along the path contacts the roller. Roller 42 is supported by an external drive bearing 45, idle bearing 47 and a press bearing 49 disposed above and below path 22, respectively. Drive bearing 45 may comprise a drive roller powered by an electric motor 48. Drive bearing 45 is in tangential peripheral contact with roller 42 and is controlled to drive roller 42 to spin at the same rate and in the same direction as the passing mail. Vibrations are induced in roller 42 with a non-contact forcing function device such as an electromagnet 44. The dampening effect on vibrations induced in roller 42 when contacted with mail piece 12 is measured with a non-contact sensor 46 to determine the stiffness of the mail piece. Roller 42 may be solid or hollow and formed from a suitable material such as steel. Roller 42 is mounted at nodal points to avoid dampening of the oscillations by the mounting device. The nodal position(s) of a rod such as roller 42 are at around 0.22-0.25 of its length. Bearings 45, 47 are located at these nodal points (given the vibration frequency, e.g. 2 Khz) along the roller to avoid interference with vibrations induced in the rod for measurement purposes. Alternatively, drive bearing 45 can be omitted and roller 42 mounted to turn freely when contacted by a mail piece traveling along path 22 to reduce frictional forces.

In another variation, forcing function devices 18, 44 are omitted. Mail pieces are conveyed along path 22 with sufficient velocity to generate measurable vibrations in beam 14 or roller 42 when the mail pieces impact the beam or rod. Vibrations induced in beam 14 or roller 42 when impacted by mail piece 12 are measured with contact or non-contact sensors 20,

46 to determine the stiffness of the mail piece. The decay rate of the vibrations is correlated to with processor 34 determine the stiffness of the mail piece.

Figure 13:
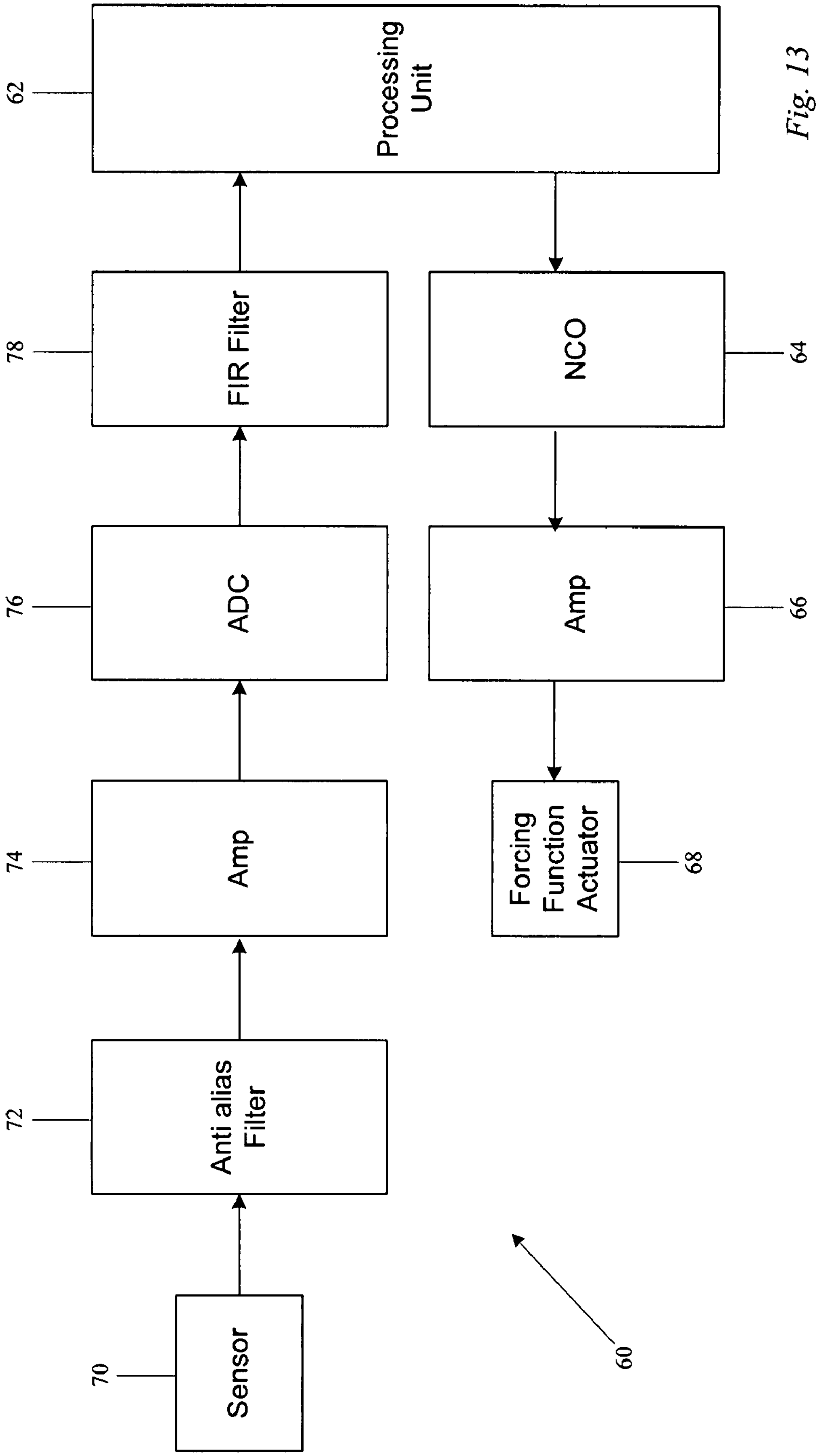
FIG. 13 is a schematic representation of a control circuit for a thickness detector according to the invention.

FIG. 13 is a schematic representation of a control circuit 60 for thickness detectors 10, 40. A processor 62 sends a signal to a numerically controlled oscillator (NCO) 64 that transmits a signal having the desired frequency to an amplifier 66. Amplifier 66 powers a forcing function actuator 68, such as an electromagnet, to generate vibrations in a vibrating deflector such as beam 14 or roller 42.

Sensor 70 detects the vibrations in the deflector when the deflector is contacted with a mail piece and transmits the corresponding signal to processor 62. An anti alias filter 72, amplifier 74, analog to digital converter 76 and Finite Impulse Response (FIR) filter 78 are used to filter, amplify, convert and condition the signal from sensor 70 for use by processor 62. The output of processor 62 is a signal corresponding to a stiffness value for the mail piece. The signal may be used to directly control a downstream diverter to divert mail pieces having an unacceptable stiffness value from the main stream and/or sent to a second processor or control computer which utilizes the signal to actuate downstream equipment to divert incompatible mail pieces from the mail stream.

Figure 14:
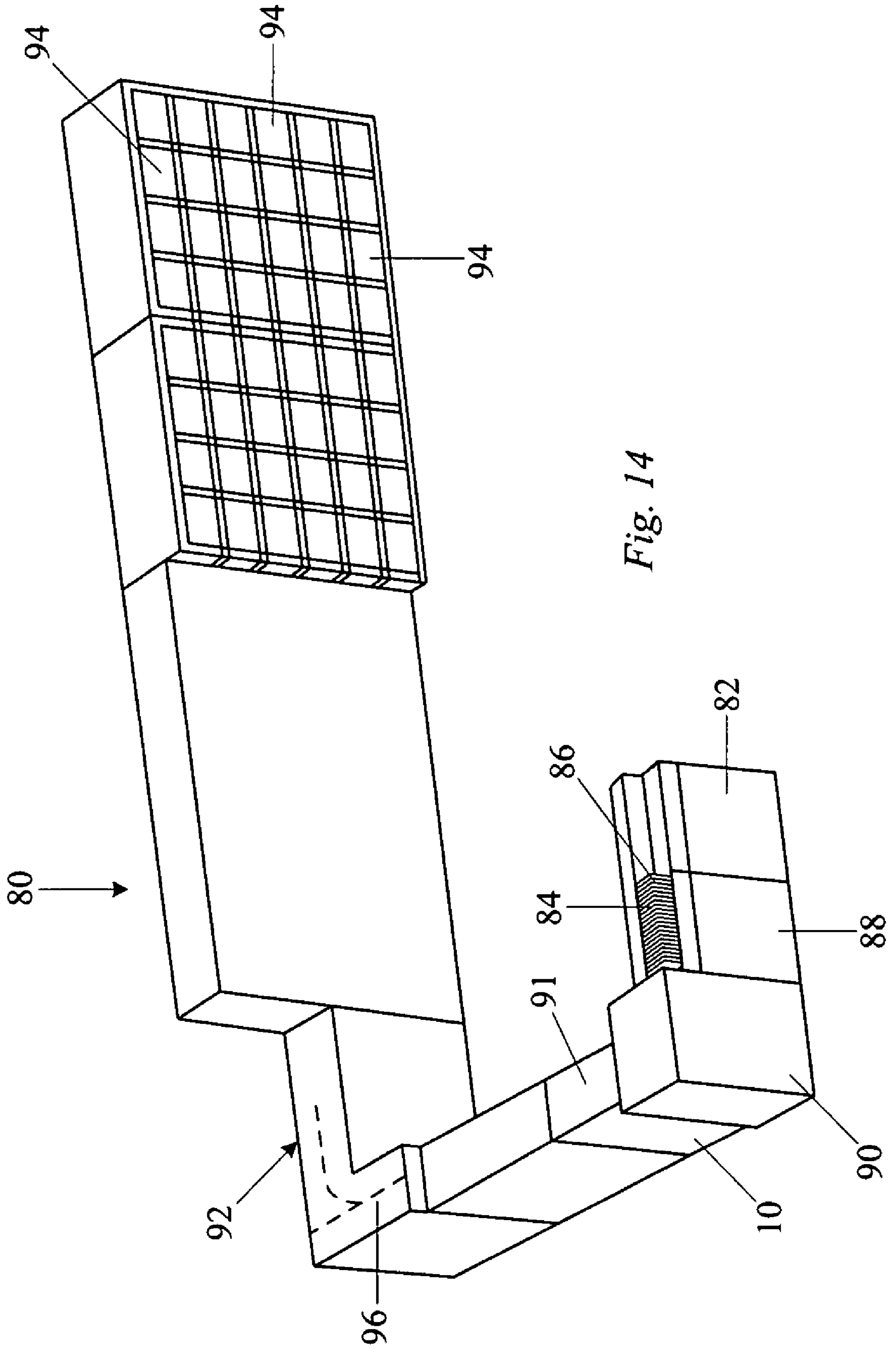
FIG. 14 is a perspective view of a mail processing machine according to the invention.

A stiffness detection system according to the invention can be used in a mail processing machine such as a DBCS machine 80 as shown in FIG. 14. Such a machine includes a mail feeder 82 upon which a stack 84 of unsorted mail pieces 86 are loaded for processing. Mail feeder 82 has a jogger-conveyor 88 that advances the stack 84 to a pick off apparatus 90 that feeds a singulated stream of individual mail pieces through a transport section 91 to an automated sorting section 92 which sorts the mail in one or more passes to a plurality of bins 94. In transport section 91, each mail piece is scanned for address information. Sorting section 92 is limited in terms of the thickness, stiffness and combined thickness and stiffness of mail pieces that it can process.

A detector 10 (or 40) according to the invention may be incorporated into transport section 91 between pick off 90 and sorting section 92, so that the singulated stream of mail pieces 86 pass through detector 10 before being conveyed to sorting section 92 for processing. A divert 96 for diverting mail pieces rejected due to excessive thickness is positioned between detector 10 and sorting section 92. A controller activates divert 96 upon receiving a signal from detector 10 indicating that a mail piece is too stiff. Divert 96 is located at one end of transport section 91 just upstream from an entry end of sorting section 22 and diverts rejected mail pieces by causing them to continue traveling in a straight line and be ejected from one end of sorter 10, rather than be conveyed around a 90-degree curve as shown for non-diverted mail entering sorting section 92. This arrangement avoids potential jamming of the reject that might occur if an angled divert were employed.

While this invention has been described with reference to illustrative embodiments, this description is not intended to be construed in a limiting sense. Various modifications and combinations of the illustrative embodiments will be apparent to persons skilled in the art upon reference to the description. Such variations and additions are specifically contemplated to be with the scope of the invention. It is intended that the appended claims encompass any such modifications or embodiments.

The invention claimed is:

1. An apparatus for determining the stiffness of passing mail pieces conveyed on a belt conveyor system comprising:

a deflector positionable to contact mail pieces conveyed past the deflector by the conveyor system, which deflector vibrates when in contact with a passing mail piece;

a sensor that measures a parameter indicative of a change in the vibrations of the deflector and generates a signal indicative of the measured parameter; and a processor that receives the signal from the sensor and is programmed to determine a stiffness value for the mail piece based on decay in vibrations of the deflector caused by contact with the mail piece.

2. The apparatus of claim 1 further comprising a forcing function device positioned to induce vibrations in the deflector.

3. The apparatus of claim 2 wherein the forcing function device is an electromagnet.

4. The apparatus of claim 2 wherein the forcing function device is an audio speaker.

5. The apparatus of claim 1, wherein the deflector comprises an elongated member secured to a fixture at a proximal end of the elongated member.

6. The apparatus of claim 1, further comprising a first pinch belt conveyor section positioned upstream from the deflector and a second pinch belt conveyor section positioned downstream from the deflector, which second conveyor section receives mail pieces from the first conveyor section along a conveyor path, wherein the deflector has a distal end positioned in the conveyor path to deflect a mail piece in a deflection direction.

7. The apparatus of claim 6, wherein the deflector comprises an elongated bar secured to a fixture at a proximal end of the elongated member, and has a rounded distal end surface positioned to contact and deflect passing mail pieces.

8. The apparatus of claim 6, wherein the second conveyor section is oriented at an obtuse angle less than 180 degrees relative to the first conveyor section in the direction of deflection.

9. A method for removing excessively stiff mail pieces being transported on a conveyor system from a mail processing machine, comprising:

feeding mail pieces to be processed one at a time into a belt conveyor of the mail processing machine;

conveying the mail pieces on the belt conveyor one at a time past an apparatus for determining the stiffness of passing mail pieces, which apparatus includes a deflector positioned to contact the mail pieces conveyed past the deflector by the conveyor, which deflector vibrates when in contact with a passing mail piece, a sensor that measures a parameter indicative of change in the vibrations of the deflector and generates a signal indicative of the measured parameter, and a processor that receives the signal from the sensor and determines a stiffness value for the mail piece based on decay in vibrations of the deflector caused by contact with the mail piece;

determining the stiffness of each mail piece using the stiffness determining apparatus; and diverting out of the mail processing machine mail pieces having excessive stiffness.

10. The method of claim 9, wherein the mail processing machine is a mail sorting machine wherein a sorted mail piece is diverted to one of a plurality of bins based on scanned address information, and the diverting step is carried out before a mail piece having excessive stiffness reaches a stacker section of the machine housing the bins.

11. The method of claim 10, further comprising determining a threshold stiffness that will cause the mail piece to be diverted out of the machine.

12. The apparatus of claim 1, wherein the sensor is positionable to monitor changes in magnitude and frequency of vibrations of the deflector.

13. The apparatus of claim 12, further wherein the processor is programmed to determine a decay rate by counting the number of readings taken between an upper set point and a lower set point in a plot of vibration amplitude versus time created by the processor from the signal, and stopping the counter when the value of the readings are below the lower set point.

14. The method of claim 9, wherein the sensor monitors changes in magnitude and frequency of vibrations of the deflector.

15. The method claim 14, further comprising:

determining a decay rate by counting the number of readings taken between an upper set point and a lower set point in a plot of vibration amplitude versus time created by the processor from the signal, and stopping the counter when the value of the readings are below the lower set point;

if the decay rate is lower than a desired value, then diverting the mail piece in the diverting step.

* * * * *